(No Model.)
W. H. BRYAN.
DOUGH OR BUTTER WORKER.
No. 290,392. Patented Dec. 18, 1883.
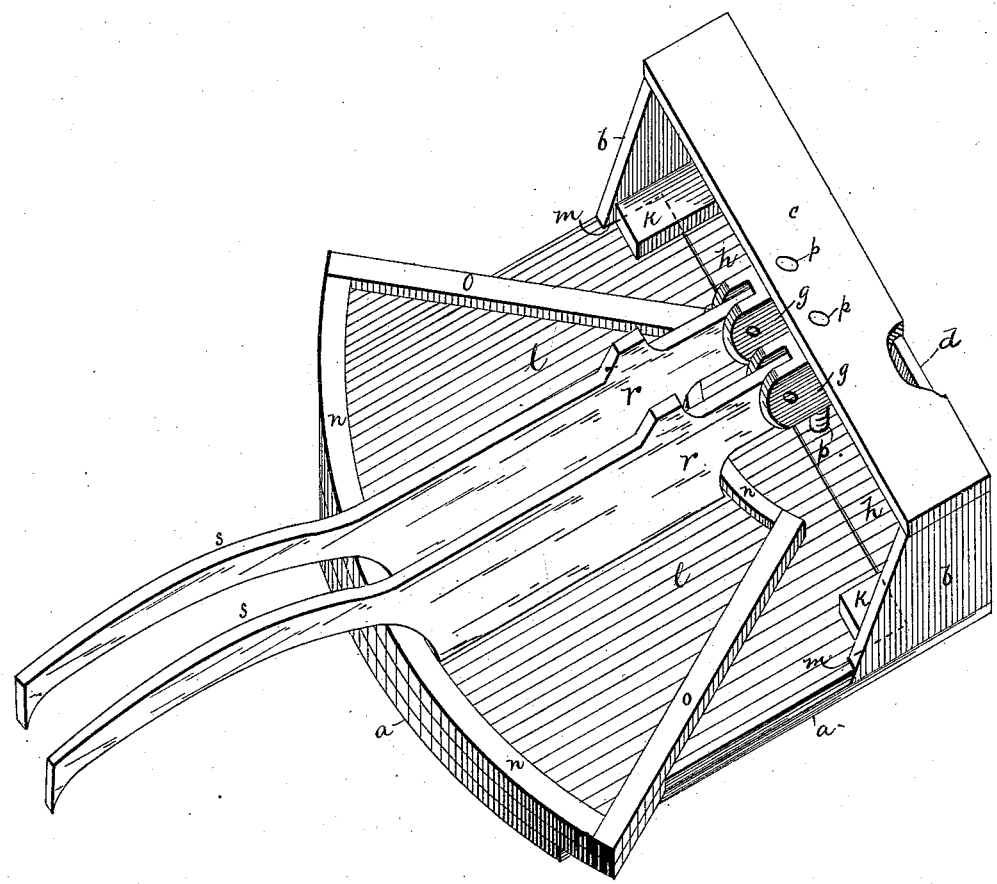
WITNESSES
H. B. Brown
Solon C. Kemon
INVENTOR
Wm. H. Bryan
By Munn & Co.
Attorneys.

United States Patent Office.

WILLIAM H. BRYAN, OF WARM SPRINGS, VIRGINIA.

DOUGH OR BUTTER WORKER.

SPECIFICATION forming part of Letters Patent No. 290,392, dated December 18, 1883.

Application filed July 13, 1883. (No model.)

*To all whom it may concern:*

Be it known that I, WILLIAM H. BRYAN, of Warm Springs, in the county of Bath and State of Virginia, have invented a new and useful Improvement in Dough or Butter Workers; and I do hereby declare that the following is a full, clear, and exact description of the same, reference being had to the accompanying drawing, forming part of this specification, in which a perspective view of my invention is shown.

My invention relates to improvements in dough or butter workers; and it consists in the peculiar construction and arrangement of the parts, as hereinafter more fully set forth, and pointed out in the claim.

Referring to the drawing, $a$ represents a flat board or plate of metal, provided near its rear end with the opposite parallel side uprights, $b$, the upper ends of which are joined together by the horizontal board or plate of metal $c$ and vertical back plate, $d$.

$h$ represents a board or plate of metal secured to the plate $a$, between the uprights $b$, to the upper face of which plate $h$ is secured, at its ends, the projecting pieces $k$, adapted to fit over the bottom board, $l$, of the tray, provided with side recesses, $m$, which receive the uprights $b$, thus holding the tray in position on the plate $a$, and at the same time allowing it to be removed from the plate $a$ when desired, for cleaning the tray more readily, when necessary. The bottom board, $l$, of the tray is provided on its upper face with the parallel arc-shaped projections $n$ $n$, and radial projections $o$ $o$, the latter intersecting the former, and forming a fence or inclosure to hold the dough or butter to be worked.

$p$ $p$ represent pintles, journaled near the middle of the opposite plates $c$ and $h$, to each of which pintles is secured a slotted arm, $g$.

In the slot of each arm $g$ is pivoted a lever or beater, $r$, provided with a handle, $s$, whereby the beaters can be raised and lowered to work the dough or butter, as desired, and at the same time can be moved in the arc of a horizontal plane on the pintle, so as to thoroughly work all the dough or butter contained in the tray, and from its circular movement in the arc of a horizontal circle can be brought to coincide with the radial pieces $o$ of the tray, so as thoroughly to work all the dough or butter.

In the working the levers or beaters should be operated alternately in a vertical direction. When one is up, the other should be down, which motion imparted to the material will cause it to be worked and spread to the sides of the tray. Then, by throwing the levers or beaters to the outside of the dough in the tray, it can be brought to the middle of the tray by drawing the levers or beaters together, at the same time gradually raising them as they approach the center of the tray. This working is repeated as often as necessary.

For the working of butter, it would be better to have a separate removable butter-tray of the same shape and dimensions as the dough-tray, the removable butter and dough trays being identical in construction.

In the use of my invention the heat produced by the hands is entirely avoided, and greater cleanliness produced.

What I claim as my invention, and desire to secure by Letters Patent, is—

In a dough or butter worker, the combination, with the plates $a$ $h$, parallel uprights $b$, plate $c$, projecting pieces $k$, slotted arms $g$, pintles $p$, and levers or beaters $r$, pivoted in the slots of the arms $g$, of the removable tray $l$, provided with the recesses $m$ $m$, arc-shaped projections $n$, and radial projections $o$, substantially as described, and for the purpose set forth.

WILLIAM H. BRYAN.

Witnesses:
  G. L. BROWN,
  THOS. A. COLLEY.